United States Patent [19]
Blumer et al.

[11] Patent Number: 5,835,788
[45] Date of Patent: Nov. 10, 1998

[54] SYSTEM FOR TRANSFERRING INPUT/OUTPUT DATA INDEPENDENTLY THROUGH AN INPUT/OUTPUT BUS INTERFACE IN RESPONSE TO PROGRAMMABLE INSTRUCTIONS STORED IN A PROGRAM MEMORY

[75] Inventors: Marc Blumer, Half Moon Bay; Wayne Ando, San Jose, both of Calif.

[73] Assignee: Electronics for Imaging, San Mateo, Calif.

[21] Appl. No.: 716,555

[22] Filed: Sep. 18, 1996

[51] Int. Cl.⁶ .............................. G06F 13/14; G06F 13/12
[52] U.S. Cl. .......................... 395/843; 395/842; 395/853; 395/885
[58] Field of Search .................................. 395/842, 843, 395/853, 885, 285

[56] References Cited

U.S. PATENT DOCUMENTS

| | | | |
|---|---|---|---|
| 4,042,914 | 8/1977 | Curley et al. | 364/200 |
| 4,809,216 | 2/1989 | Lai | 364/900 |
| 4,821,180 | 4/1989 | Gerety et al. | 364/200 |
| 4,984,182 | 1/1991 | Chang et al. | 364/519 |
| 4,992,958 | 2/1991 | Kageyama et al. | 364/519 |
| 5,016,114 | 5/1991 | Sakata et al. | 358/404 |
| 5,023,813 | 6/1991 | Brown, III | 364/519 |
| 5,057,997 | 10/1991 | Chang et al. | 364/200 |
| 5,058,037 | 10/1991 | Kageyama et al. | 364/519 |
| 5,163,123 | 11/1992 | Kadono | 395/116 |
| 5,197,129 | 3/1993 | Kayama et al. | 395/275 |
| 5,276,781 | 1/1994 | Chang et al. | 375/116 |
| 5,307,458 | 4/1994 | Freiburg et al. | 395/162 |
| 5,315,691 | 5/1994 | Sumiya et al. | 395/109 |
| 5,345,567 | 9/1994 | Hayden et al. | 395/375 |
| 5,349,647 | 9/1994 | Freiburg et al. | 395/115 |
| 5,357,617 | 10/1994 | Davis et al. | 395/375 |
| 5,463,743 | 10/1995 | Galloway | 395/285 |
| 5,566,306 | 10/1996 | Ishida | 395/309 |
| 5,574,873 | 11/1996 | Davidian | 395/376 |
| 5,588,120 | 12/1996 | Shitara et al. | 395/200.15 |

*Primary Examiner*—Thomas C. Lee
*Assistant Examiner*—Rehana Perveen
*Attorney, Agent, or Firm*—Michael A. Glenn

[57] ABSTRACT

A programmable DMA controller that uses an instruction set dedicated to moving data efficiently over a bus, comprising a program memory, a program counter, a FIFO memory, a bus buffer, registers, an accumulator, and an ALU. The DMA controller instruction set comprises the following instructions: load, move, add, subtract, branch on zero, branch on not zero, lock, and interrupt. Another DMA controller embodiment uses a SIMD processor. In operation, a CPU downloads DMA programs to the DMA controller. The DMA controller stores these programs in its program memory. The CPU signals the DMA to begin a DMA transfer operation. The ALU and associated devices execute the program instructions to perform the desired DMA transfer. The DMA controller then sends an interrupt to the CPU to indicate the DMA transfer is complete.

23 Claims, 3 Drawing Sheets

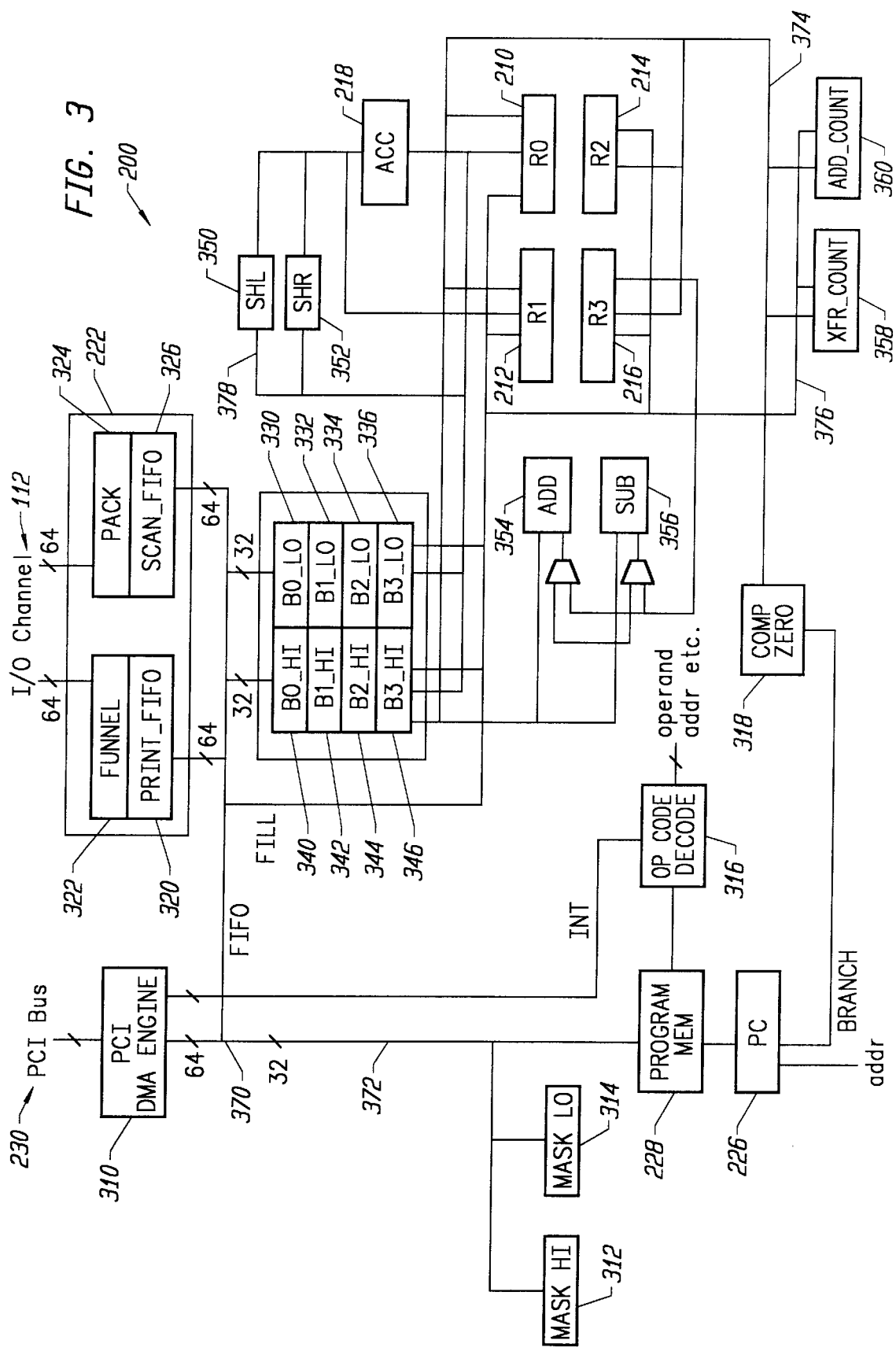

SYSTEM FOR TRANSFERRING INPUT/ OUTPUT DATA INDEPENDENTLY THROUGH AN INPUT/OUTPUT BUS INTERFACE IN RESPONSE TO PROGRAMMABLE INSTRUCTIONS STORED IN A PROGRAM MEMORY

BACKGROUND OF THE INVENTION

1. Field of the Invention

This invention relates to the field of input/output (I/O) processors for printing applications, and more specifically to Direct Memory Access (DMA) processors used to drive print engines.

2. Background Art

The process of printing a file from a computer system to an attached printer requires high performance memory accessing operations. Current printer drivers do not provide the required performance.

The disadvantage of current printer driver systems can be understood by a review of a computer system and printer. A computer system includes a central processing unit (CPU), often a microprocessor, that is used to execute program instructions to perform functions on data. The processor acts on data stored in a memory such as a random access memory (RAM) and communicates with the memory through a communication path known as a "bus."

A printer receives data from the computer system and translates it into a raster image form for printing using a print engine. The print engine communicates with the processor through a device interface or device controller that is coupled to the bus. In simple prior art systems, when a file is to be printed, the processor provides blocks of the file data from the memory to the printer driver using the bus. The driver provides the blocks of data to the print engine. If more data is needed, the driver sends a request to the processor. Such repeated requests interrupt other processes of the processor and retard system performance. To solve such problems, the prior art provides device interfaces that can access memory themselves without processor intervention. Such interfaces are known as direct memory access (DMA) controllers.

A DMA controller is able to access memory on its own without processor intervention. Initially, prior art printer drivers that could perform DMA functions only transferred contiguous blocks of data from memory to the print engine. In some applications, other types of memory access are required. For example, it may be necessary to decompress the data from memory, to retrieve non-contiguous blocks of data, perform memory to memory transfers, or other complex memory functions. The prior art has provided DMA controllers that are optimized for one of these functions, but there are no DMA controllers that can be programmed using logical operators to effectively perform multiple types of memory access functions. Similarly, there are no prior art DMA controllers that can be adapted to perform new memory access functions as needed.

Prior art printing systems are described in the following references.

In U.S. Pat. Nos. 5,349,647 and 5,307,458 Freiburg et al. describe a printing machine for concurrently processing first and second sets of image data. The printing machine comprises a video processor, capable of processing the first set of image data, a system memory, adapted to store the second set of image data, and a bus for transmitting image data, addresses and control data there across. Both the video processor and the system memory are coupled with the bus. The machine further comprises an apparatus for transferring the second set of image data between the input/output device and the system memory substantially concurrent with the first set of image data being processed in the video processor.

The Zoran ZR36120 Data Sheet describes a multimedia controller for the PCI bus. The device features include in part: interfacing to a YUV 4:2:2 digital video bus; independent horizontal and vertical downscaling, with optional horizontal filtering of the input image; conversion of the YUV 4:2:2 digital video input into one of several pixel formats; and two DMA channels for burst transfers of video and coded bit-stream. The device includes application specific registers that control data transfers including: the configuration parameters of the video source, the video display, and masking maps.

In U.S. Pat. No. 5,276,781 Chang et al. describe a frame buffer used by a laser printer controller to send video signals to a laser printer engine. The dimension of the frame buffer can be controlled by software. The frame buffer allows for hardware assisted memory erase. Chang et al. describe defining the starting address, and the sizes of different data components for the frame buffer.

In U.S. Pat. No. 4,984,182 Chang et al. describe a frame buffer used by a laser printer controller to send video signals to a laser printer engine. The frame buffer X and Y dimensions are software controllable. The loading of the frame buffer start address is also controlled by software.

In U.S. Pat. No. 5,016,114 Sakata et al. describe a digital copier using a laser card or like external storing medium for storing image data. Sakata et al. further describes using a DMA controller to control the flow of image data as instructed by an MPU.

In U.S. Pat. No. 5,463,743 Galloway describes a method for actively patching SCSI processor instructions. In a first case, tag values assigned to queues for tagged queue operation are a multiple of the SCSI processor jump instruction length. When re-selected, the tag value is patched or over-written as the least significant byte of the address of a jump instruction. The upper bytes point to the beginning of a jump table. Each entry in the jump table is a jump instruction to the sequence for a particular queue or thread. In a second case, special SCSI operations are directly handled by the host device driver and the SCSI processor only performs conventional data transfers and similar operations. Galloway also describes the 53C710 SCSI I/O Processor from NCR Corporation that includes a DMA interface to allow movement of data between the SCSI devices and host computer memory without host processor intervention. The 53C710 is described as including the capability of storing SCRIPTS instructions in local memory associated with the 53C710.

In U.S. Pat. No. 5,197,129 Kayama et al. describes an input/output device with a processor which processes data strings received by the device. When a data string is received, it is passed to a serial interface and a timing means. The serial interface generates a signal which interrupts the existing processing by the processor and causes the process to start processing of the newly received data string. At the same time the timing means measures the length of the data string and compares it with a predetermined length set by user-controllable data setting means. If the data string length reaches the predetermined length, the processor is triggered to stop processing the new data string and to recommence the processing it was performing prior to interruption.

In U.S. Pat. No. 5,163,123 Kadono describes an image forming apparatus for receiving image data sent from an external apparatus which forms an image dot image data on paper. The apparatus includes a bit map memory to store dot image data of one page and a buffer memory to store dot image data of a predetermined amount. In the image forming apparatus, dot image data are read out from the bit map memory in a unit of one scan line and are written in the buffer memory, and dot image data are read out from the buffer memory and are outputted to a printer engine. A start signal is generated for every scan line.

In U.S. Pat. No. 4,809,216 Lai describes a print engine data interface for sequentially accessing locations in a full page bit map for either retrieving the data therein and forwarding it to a print engine for subsequent printing, or for issuing a refresh command to refresh the data. A bit map address counter generates address locations in the full page bit map that the print engine data interface accesses. A scan offset adjustment circuit in combination with a refresh and read/write arbitration logic circuit and the bit map address counter are provided so that the print engine data interface only accesses address locations for read/write retrieval that contain printing instructions to be forwarded to the print engine.

In U.S. Pat. No. 4,821,180 Gerety et al. describe an apparatus for use with a DMA controller which includes a device interface controller having therein both general and specific command programs, and a device bus interface. The apparatus is arranged to intercept all communication signals between the DMA controller an d a microcomputer associated therewith.

In U.S. Pat. No. 5,315,691 Sumiya et al. describe a print control apparatus for use with a printer for forming a print output based on command data generated by a computer. The print control apparatus includes a line segment data conversion unit for converting computer-generated command data to successive pieces of line segment data each having a position and a length in a raster direction, and a raster image data conversion unit for converting the line segment data to raster image data based on which printing is performed by the printer.

In U.S. Pat. Nos. 4,992,958 and 5,058,037 Kageyama et al. describe a printer controller which receives a command series containing a drawing command for instructing a drawing operation, and also a printing command for instructing a printing operation, the command series being transmitted from a host computer, there are employed a central processing unit and a memory unit, and a command buffer unit for storing the command series and a page buffer unit for storing plural pages of drawn dot image data formed in the memory unit. The central process unit executes both a task process program for executing the drawing command and printing command as a drawing task and a printing task respectively, and a task control program for performing a task control for processing the respective tasks in this task process program. In U.S. Pat. No. 5,023,813 Brown describes a page printer including a print engine and a controller which includes a non-volatile memory having an EEPROM and a chip RAM. A microprocessor under program control manages the placement of data in the EEPROM of the non-volatile memory. The EEPROM and the associated chip RAM are structured to have a control block and a data storage portion. The control block includes pointers indicating the locations in the non-volatile memory where data is stored. If a data location becomes faulty, the value of the pointer to that location is changed so that the pointer points to a previously unused portion of the non-volatile memory.

The limited flexibility provided by prior art DMA controllers that are only controlled by register based parameters is inadequate to perform the compression, duplexing, and other non-contiguous functions that are required by many complex computer systems. Another type of DMA controller are dedicated ASICs that are hardwired to perform specific types of DMA transfers. Such ASIC DMA controllers are limited by the hardwired control program and by definition this program cannot be changed to perform completely different transfer algorithms. A programmable DMA controller with greater flexibility is therefore required which can be programmed by the CPU to perform a wide range of complex data transfer algorithms and thereby provide a general solution to data transfer applications.

SUMMARY OF THE INVENTION

The present invention is a programmable I/O processor that provides a general solution method and apparatus for transferring data on a bus without requiring CPU control. The invention is a specialized processor that uses an instruction set dedicated to moving data efficiently over a bus. One embodiment DMA controller of the present invention comprises a program memory, a program counter, a FIFO memory, a bus buffer, registers, an accumulator, and an ALU. The preferred embodiment DMA controller instruction set comprises the following instructions: load, move, add, subtract, branch on zero, branch on not zero, lock, and interrupt. Another embodiment uses a SIMD processor in the DMA controller.

In operation, in one embodiment, a CPU downloads DMA programs to the DMA controller. The DMA controller stores these programs in its program memory. The CPU signals the DMA controller to begin a DMA transfer operation. The ALU and associated devices execute the program instructions to perform the desired DMA transfer. The DMA controller then sends an interrupt to the CPU to indicate the DMA transfer is complete.

The applications for the present invention DMA controller are as flexible as the instruction set. Examples of application in the context of a DMA controller printer driver include memory fill and memory copy operations, duplex printing, DMA chaining, and driving an image compressor. The present invention DMA controller allows DMA transfers to be programmed through new programming as new types of applications are developed.

BRIEF DESCRIPTION OF THE DRAWINGS

FIG. 3 is a detailed block diagram of the programmable DMA controller of the present invention.

DETAILED DESCRIPTION OF THE INVENTION

The present invention is directed to a programmable I/O processor for printing applications. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

The present invention programmable I/O processor provides a general solution to data transfer applications by using a dedicated processor programmable by a CPU to execute existing and future DMA transfer applications.

Figure 1:
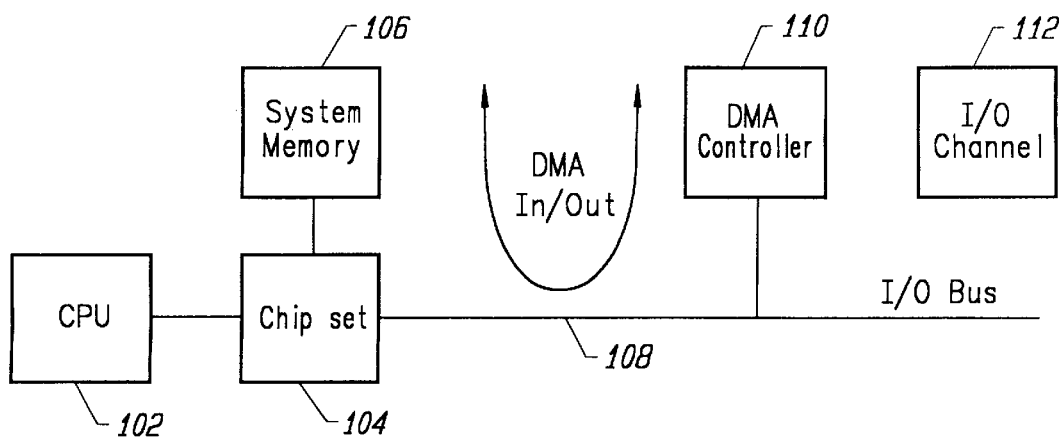
FIG. 1 is a block diagram of a computer system with the programmable DMA controller of the present invention.

FIG. 1 is a block diagram of a computer system with a DMA controller of the present invention. Element 102 is a CPU. Element 104 is a chip set supporting CPU 102 and is coupled to CPU 102. Element 106 is a memory storage element and is coupled to Chip Set 104. Element 108 is an input output (I/O) bus and is coupled to Chip Set 104. Element 110 is a programmable DMA controller of the present invention, and is coupled to I/O bus 108. In the preferred embodiment of the present invention, DMA Controller 110 includes its own program memory 228. Element 112 is an I/O channel and is coupled to programmable DMA controller 110. I/O Channel 112 is, for example, a synchronous FIFO interface capable of driving a print engine, such as a laser printer.

In operation, a user may, for example, enter a command to print a file. If the program required to execute the DMA transfer is not already loaded in DMA controller 110, then CPU 102 may download the required DMA transfer program and parameters. CPU 102 issues a start signal to DMA controller 110. DMA controller 110 executes the DMA transfer program, and directly accesses System memory 106. DMA controller 110 transfers data from System memory 106, in either contiguous or non-contiguous blocks of memory, to I/O Channel 112. The data may then be further processed before being transmitted to a print engine such as a laser printer. Other applications are described in greater detail below.

The invention results in a programmable DMA controller. The invention is understood by reference to a functional block diagram in FIG. 2, a set of program instructions in Table 1, a detailed diagram in FIG. 3, a system level flow chart in FIG. 4, and several examples of uses of the invention in performing memory accesses. These examples include DMA chaining, memory copy, and memory fill.

Figure 2:
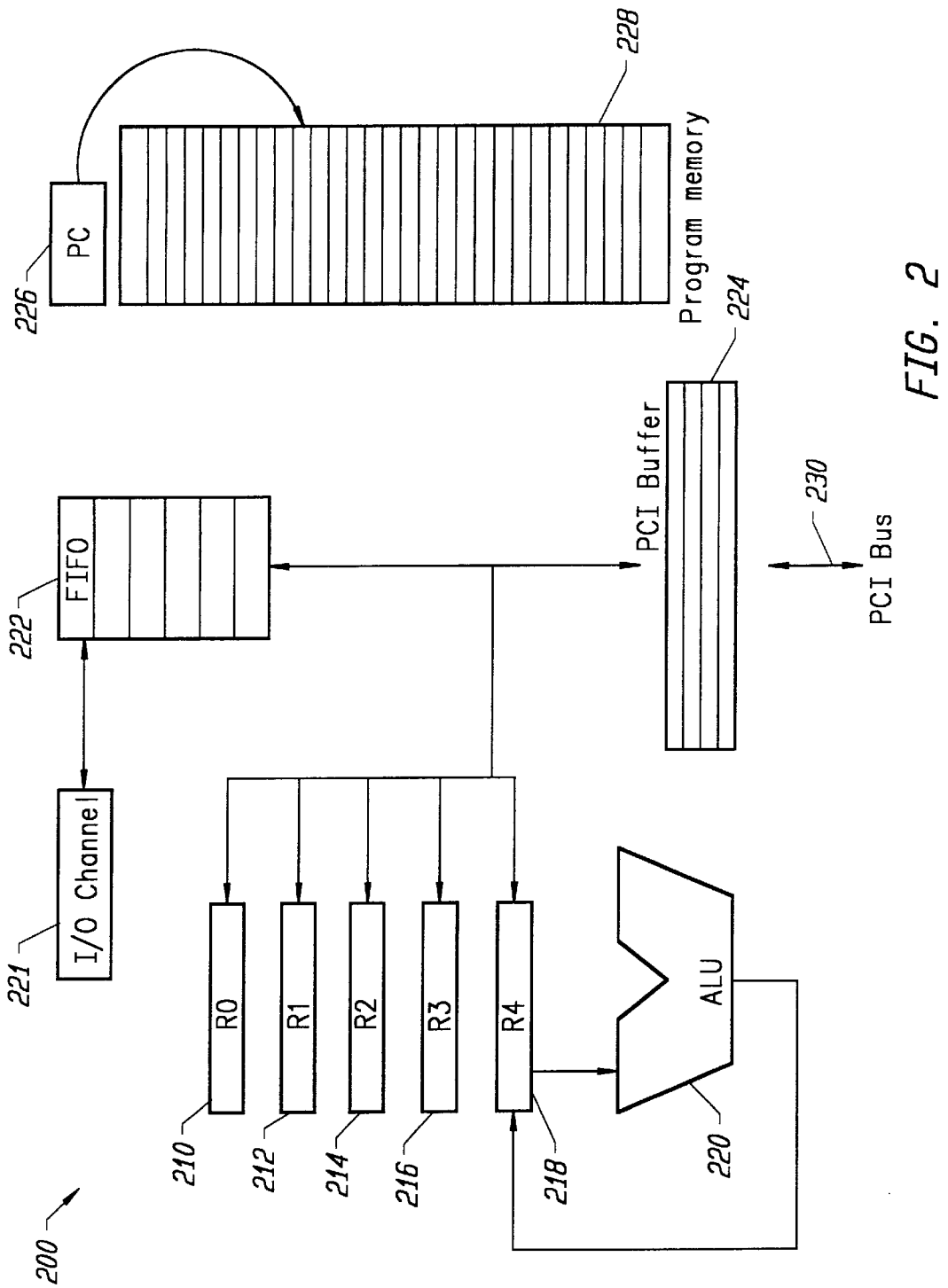
FIG. 2 is a high level block diagram of the programmable DMA controller of the present invention.

Referring first to FIG. 2, a block diagram of the DMA controller of FIG. 1 is illustrated. Elements 210, 212, 214, and 216 are 64-bit general purpose registers that are used to control and track programmable DMA controller operations. Element 218 is an accumulator. Element 230 is a Peripheral Component Interconnect ("PCI") bus, for example, a 33 MHz PCI bus compliant to the PCI Local Bus Specification Revision 2.1. Element 224 is a PCI buffer. Element 220 is an Arithmetic Logic Unit ("ALU"). Element 222 is a First In First Out (FIFO) memory. Element 226 is a program counter register.

The connections shown in FIG. 2 highlight the flow of DMA transfer parameters and data in the DMA controller. Detailed connections between the DMA controller are illustrated in FIG. 3. Program Counter 226 is coupled to Program Memory 228. PCI Bus 230 is coupled to PCI Buffer 224. PCI Buffer 224 is coupled to FIFO 222, Registers R0 210, R1 212, R2 214, R3 216, Accumulator 218 and FIFO 222. I/O Channel 212 is coupled to FIFO 222. Accumulator 218 is coupled to the input of ALU 220, and the output of ALU 220 is coupled to Accumulator 218.

As noted above, the DMA controller has its own program memory 228. In the preferred embodiment, Program Memory 228, and Registers R0 210, R1 212, R2 214, and R3 218 all reside in the PCI configuration space. Registers R0 210, R1 212, R2 214, and R3 218 are used, for example, as address pointers to memory, as loop counters, and as gathering registers for byte operations. Data is transferred between PCI buffer 224 and I/O channel 112 through FIFO 222. ALU 220 performs arithmetic, logic, and related operations. Accumulator 218 provides a temporary storage register for the results of arithmetic or logic operations, including from ALU 220. For example, ALU 220 uses Accumulator 218 when performing such operations as addition, subtraction, shift left and shift right. These operations are performed, for example, to increment and decrement addresses and loop counters, as well as in byte shift operations. PCI Buffer 224 provides storage for information transferred via PCI Bus 230. Program Memory 228 stores the DMA Controller programs that control the DMA transfers. The control program stored in Program Memory 228 controls all the operations between PCI Buffer 224 and FIFO 222. Program Counter 226 stores the address of the memory location containing the next program instruction to be executed, and tracks the DMA Controller's progress through the program. To take advantage of the programmable DMA of the present invention, an instruction set has been developed that is used to create programs for execution by a DMA. This instruction set is illustrated below in Table 1.

TABLE 1

| INSTRUCTIONS | OPERANDS | MACHINE LANGUAGE |
|---|---|---|
| LOAD | -To ACC, source | 000 0 Source[1] |
|  | -From source, ACC | 000 1 Destination[2] |
| MOVE | -Buffer to Bus | 001 00 0-- |
|  | -Bus to Buffer | 001 00 1-- |
|  | -FIFO to Buffer | 001 01 1-- |
|  | -Buffer to FIFO | 001 01 1-- |
|  | -Buffer to REG | 001 10 0 Rsel[3] |
|  | -REG to Buffer | 001 10 1 Rsel[3] |
|  | -DMAWR (FIFO to Bus) | 001 11 00-- |
|  | -DMARD (Bus to FIFO) | 001 11 10-- |
|  | -DMAFILL (REG to Bus) | 001 11 01 Src[4] |
| ADD | -operand | 010-- --Opsel[5] |
|  | -R3 |  |
| SUB | -operand | 011-- --Opsel[5] |
|  | -R3 |  |
| BZ | -To address | 100 Addr[6] |
| BNZ | -To address | 101 Addr[6] |
| LOCK | -LOWORD, Mask | 110 0 Mask[7] |
|  | -HIWORD, Mask | 110 1 Mask[7] |
| INT |  | 111-- |

[1]Source may be any of the following values:
0 = B0_LO
1 = B0_HI
2 = B1_LO
3 = B1_HI
4 = B2_LO
5 = B2_HI
6 = B3_LO
7 = B3_HI
8 = R0
9 = R1
10 = R2
11 = R3
12 = ACC BYTE SHL
13 = ACC BYTE SHR
14 = XFR_COUNT
15 = ADD_COUNT
[2]Destination may be any of the preceding Source values excluding 12, and 13.
[3]Rsel:
0 = B0_HI, B0_LO <=> R1, R0
1 = B1_HI, B1_LO <=> R1, R0
2 = B2_HI, B2_LO <=> R1, R0
3 = B3_HI, B3_LO <=> R1, R0
[4]SRC:
0 = R1, R0
1 = B0_HI, B0_LO
[5]Opsel:
0 = Operand is absolute value from opcode TABLE 1-continued 1 = Operand from R3
[6]Addr:
0 through 31.
[7]Mask:
0 = load byte from FIFO to BUFFER
1 = do not load byte into BUFFER.

The LOAD instruction transfers data to or from Accumulator 218. The MOVE instruction moves data between designated components, for example, from PCI Buffer 224 to FIFO 222. As indicated in TABLE 1, the MOVE command can be used to move data between a number of components, including for example, PCI Buffer 224, System Memory 106, FIFO 222, and Registers R0 210, R1 212, R2 214, and R3 216. The PCI Buffer 224 to Register MOVE, and the Register to PCI Buffer 224 use the operand Rsel as described above in note 3. For example, Rsel=0 defines a transfer between the B0_HI, B0_LO buffer cells and Registers R0 210 and R1 212. The bit preceding Rsel determines the direction of the transfer. The DMAWR MOVE instruction is a DMA write instruction which moves data from FIFO 222 to PCI Bus 230. The DMARD MOVE instruction is a DMA read instruction which moves data from PCI Bus 230 to FIFO 222. The DMAFILL MOVE instruction moves data from one of the Source storage registers listed above in note 1 to PCI Bus 230. The Src operand is 64 bits wide, and is comprised of two 32 bit words as indicated in note 4 above.

The ADD instruction adds the contents of Accumulator 218 with the operand of the instruction (which can be an absolute value or the content of Register R3 216). Similarly, the SUB instruction subtracts from the contents of Accumulator 218 the operand of the instruction (which can be an absolute value or the content of Register R3 216). The BZ instruction branches to the address specified by the operand if the value of Accumulator 218 is zero. The BNZ instruction branches to the address specified by the operand if the value of Accumulator 218 is not zero. The LOCK instruction provides a mask function to load only the selected bytes. The Mask operand in note 7 is a 4-bit mask, with one bit per byte, for example, a value of 1110 loads only the least significant byte. A "1" in the Mask prevents that byte from being loaded into PCI Buffer 224, however, data is still read out of FIFO 222 since FIFO 222 accesses are always 64 bits at a time. The INT instruction sends an interrupt via PCI Bus 230. As is well known to one of ordinary skill in the art, the present invention may also be designed to execute other instructions.

FIG. 3 is a detailed block diagram of the preferred embodiment programmable DMA controller of the present invention. Element 310 is a PCI DMA Engine. PCI DMA Engine 310 is coupled to PCI Bus 230, and element 370, which is a 64-bit interconnect. Element 372 is a 32-bit interconnect and is coupled to Interconnect 370. Element 312 is a MASK_HI register. Element 314 is a MASK_LO register. The MASK_HI 312 and MASK_LO 314 registers define the parts of other machine words that the DMA Controller 200 will operate on. MASK_HI 312 is coupled to MASK_LO 314 and Interconnect 372. Program Memory 228 is coupled to Interconnect 372. Program Counter 226 is coupled to Program Memory 228. Element 316 Opcode Decode decodes the operation codes from Program Memory 228 to serve as instructions for the DMA Controller. Opcode Decode 316 is coupled to Program Memory 228 and PCI DMA Engine 310. Element 318, Comp Zero, is a binary comparator circuit that compares input data to an all-zero value. If the input equals zero, e.g. true, then the output value is set to "1." If the input value does not equal zero then the output value is set to "0." Comp Zero 318 is coupled to Program Counter 226 and Accumulator 218.

Element 350, SHL, is a shift left logical operator and is coupled to Accumulator 218. Element 352, SHR, is a shift right logical operator and is coupled to Accumulator 218. SHL 350 and SHR 352 are coupled to node 378 and thereby to Accumulator 218, Registers R0 210, and R1 212, and PCI Buffer 224. Element 354, ADD, is an addition logical operator. Element 356, SUB, is a subtraction logical operator. ADD 354, SUB 356, SHL 350, SHR 352 are all part of ALU 220 (FIG. 2). ADD 354 is coupled to SUB 356 and Register R3 216. SUB 356 is also coupled to Register R3 216. Xfr_Count, element 358, is a register that is used, for example, to store the size of the data block to be transferred in a DMA operation. Xfr_Count 358 is coupled to node 374 and thereby to Add_Count 360, Comp Zero 318, Accumulator 218, PCI Buffer 224, Registers R0 210, R1 212, R2 214, and R3 216, ADD 354, and SUB 356.

Add_Count, element 360, is a register that is used, for example, to store addresses for transfers from PCI Bus 230 to FIFO 222. Add_Count 360 is coupled to node 376 and thereby to Registers R0 210, R1 212, R2 214, and R3 216, Xfr_Count 358, and Interconnect 370. Funnel 322, Print_FIFO 320, Pack 324, and Scan_FIFO 326 are all part of FIFO 222 (FIG. 2). Print_FIFO 222 is coupled, via a 64-bit interconnect, to node 376 and thereby to Interconnect 370, PCI Buffer 224 and other elements. Similarly, Scan_FIFO 326 is coupled, via a 64-bit interconnect, to node 376. Funnel 322 and Pack 324 both have a 64-bit coupling to I/O Channel 112. PCI Buffer 224 is comprised of eight cells: B0_LO 330, B1_LO 332, B2_LO 334, B3_LO 336, B0_HI 340, B1_HI 342, B2_HI 344, and B3_HI 346.

In operation, PCI DMA Engine 310 performs data transfers over the PCI Bus 230 using the protocol described by the PCI Local Bus Specification, Revision 2.1. PCI DMA Engine 310 also consists of various predefined PCI parameter registers used to hold status and configuration information regarding devices involved in the data transfers.

PACK 324 is a component of the scan section of FIFO 222. PACK 324 demultiplexes a singly byte-lane from I/O channel 112 into eight parallel bytes which are then written into Scan_FIFO 326. Applying PACK 324 is an option that may be used when the data from I/O channel 112 occupies only one byte-lane of the 64-bit I/O channel. Data often only occupies one byte-lane when the DMA controller is driving a print engine. PACK 324 increases the bandwidth efficiency of Scan_FIFO 326.

FUNNEL 322 is a component of the print section of FIFO 222. FUNNEL 322 is the output analog of PACK 324. FUNNEL 322 multiplexes the multi-byte-lane data from Print_FIFO 320 into a single byte stream for output over I/O channel 112. Applying FUNNEL 322 is an option that may be used when the data to be transferred to I/O channel 112 occupies only one byte-lane of the 64 it I/O channel, as is often the case in transfers to print engines. FUNNEL 322 increases the bandwidth efficiency of Print_FIFO 320.

APPLICATIONS

Figure 4:
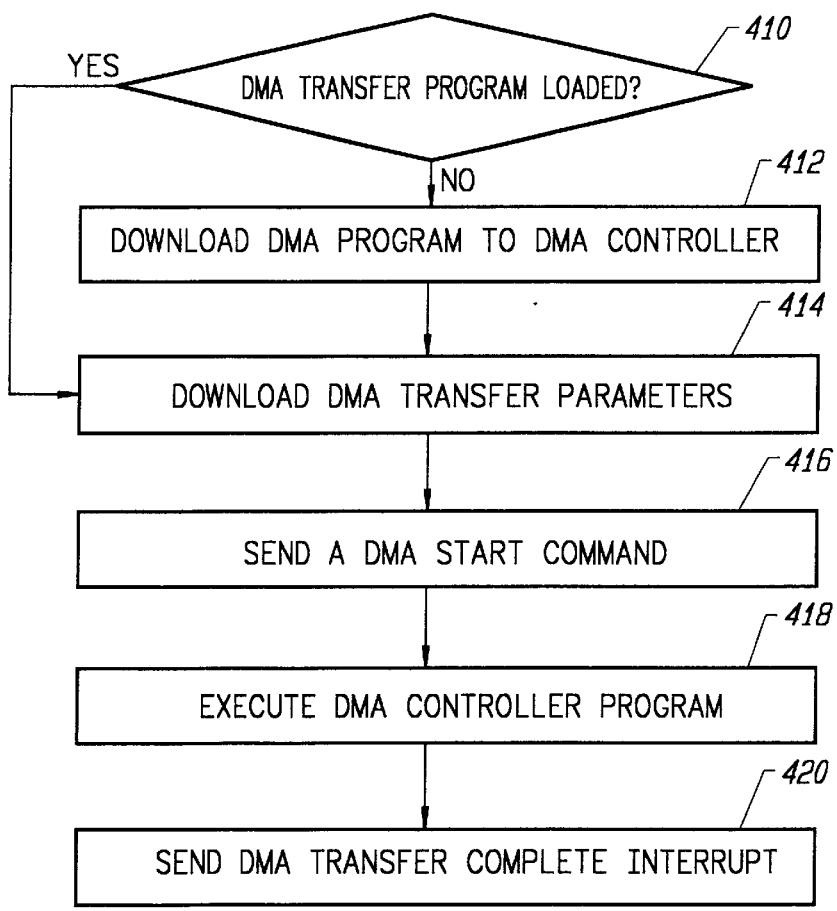
FIG. 4 is a flow chart of the system level operation of the programmable DMA controller of the present invention.

In contrast to prior art DMA controllers, the programmable DMA controller of the present invention can be programmed to perform a number of types of data transfers using the instruction set. The following are several examples of application programs for the programmable DMA controller of the present invention. FIG. 4 illustrates a general flow chart for the system level operation of DMA controller 200 operation. Step 410 is a check whether the required DMA controller program is loaded in Program Memory 228. If the required DMA controller program is not loaded then CPU 102 downloads the program in step 412. If the program is already loaded, then in step 414 CPU 102 downloads the required DMA transfer parameters into the general purpose registers R0 210, R1 212, R2 214, and R3 215. Examples of DMA transfer parameters include the start address where the data to be transferred is stored in system memory, the number of DMA transfers to be made, and the buffer size. In step 416, to start a DMA transfer CPU 102 sends a start command to DMA Controller 200. In step 418, DMA controller 200 executes the data transfer. When DMA Controller 200 completes a data transfer, in step 420 DMA Controller 200 sends an interrupt to CPU 102 to indicate completion of the transfer. This process of reprogramming the DMA Controller 200 allows it to perform all of the data transfers as described by the following examples. By contrast, typical prior art DMAs are limited to only performing predefined types of data transfers.

DMA CHAINING

DMA chaining routines transfer several non-contiguous blocks of data. An example of a DMA chaining application is transferring data stored in scattered objects in memory to a print engine. This operation is performed in the process of printing objects compressed using STAR compression. The following code provides an example of a DMA program that uses a chain of four DMA tasks to transfer data from System Memory 106 (FIG. 1) to Print_FIFO 320 (FIG. 3):

| Initial Values | | |
|---|---|---|
| PC | = | 00h |
| R0 | = | 00000810h |
| R1 | = | 00000004h |
| R2 | = | 00000000h |
| R3 | = | 00000008h |
| ACC | = | 00000000h |
| PC_WAIT | = | 0 |
| HOLD_PCn | = | 1 |
| B0_LO | = | 00000000h |
| B0_HI | = | 00000000h |
| B1_LO | = | 00000000h |
| B1_HI | = | 00000000h |
| B2_LO | = | 00000000h |
| B2_HI | = | 00000000h |
| B3_LO | = | 00000000h |
| B3_HI | = | 00000000h |
| MASK_LO | = | 0h |
| MASK_HI | = | 0h |

| Address | Instruction |
|---|---|
| 0: | LOAD ACC, R0 |
| 1: | LOAD dma_addr, ACC |
| 2: | LOAD ACC, R3 |
| 3: | LOAD dma_size, ACC |
| 4: | MOVE BUF, PCI |
| 5: | LOAD ACC, dma_size |
| 6: | BNZ 5 |
| 7: | LOAD ACC, B0_LO |
| 8: | LOAD dma_addr, ACC |
| 9: | LOAD ACC, B0_HI |
| a: | LOAD dma_size, ACC |
| b: | MOVE FIF, PCI |
| c: | LOAD ACC, dma_size |
| d: | BNZ c |
| e: | LOAD ACC, R1 |
| f: | SUB 1 |
| 10: | LOAD R1, ACC |
| 11: | BZ 16 |
| 12: | LOAD ACC, R0 |
| 13: | ADD 8 |
| 14: | LOAD R0, ACC |
| 15: | BNZ 1 |
| 16: | INT |
| 17: | HALT |
| 18: | NOP |

The parameters for each DMA task are stored in System Memory 106 (FIG. 1). Programmable DMA controller 200 stores the start address for these parameters in Register R0 210. Register R1 212 stores the number of DMAs to be performed. Register R3 215 stores the buffer size in 32-bit words. Defining the "PC_WAIT" variable to zero allows CPU 102 to continue to operate during the DMA process.

Instruction 0: "LOAD ACC, R0" loads the PCI Bus 230 to PCI Buffer 224 data transfer address from Register R0 210 into Accumulator 218. Instruction 1: "LOAD dma_addr, ACC" loads the PCI Bus 230 to PCI Buffer 224 data transfer address from Accumulator 218 to Add_Count 360. Instruction 2: "LOAD ACC, R3" loads the buffer size in 32-bit words from Register R3 215 into Accumulator 218. Instruction 3: "LOAD dma_size, ACC" loads the number of parameter transfers remaining from Accumulator 218 into Xfr_Count 358. Instruction 4: "MOVE BUF, PCI" loads the parameters for the DMA task from PCI Bus 230 into PCI Buffer 224. Instruction 5: "LOAD ACC, dma_size" loads the size of the data block to be transferred from Xfr_Count 358 into Accumulator 218. Instruction 6: "BNZ 5" branches to instruction 5 if Accumulator 218 is not zero; this is a manual check to see if the parameter transfer is complete.

Instruction 7: "LOAD ACC, B0_LO" loads the PCI Bus 230 to FIFO 222 DMA address from PCI Buffer 224 address B0_LO 330 into Accumulator 218. Instruction 8: "LOAD dma_addr, ACC" loads the PCI Bus 230 to FIFO 222 DMA address from Accumulator 218 into Add_Count 360. Instruction 9: "LOAD ACC, B0_HI" loads the PCI Bus 230 to FIFO 222 data transfer size from PCI Buffer 224 address B0_HI 340 into Accumulator 218. Instruction a: "LOAD dma_size, ACC" loads the PCI Bus 230 to FIFO 222 DMA size from Accumulator 218 into XFR_Count 358. Instruction b: "MOVE FIF, PCI" transfers data from PCI Bus 230 to FIFO 222. Instruction c: "LOAD ACC, dma_size" loads the current data transfer count from XFR_Count 358 to Accumulator 218. Instruction d: "BNZ c" branches to instruction "c" if Accumulator 218 is not zero; this manually checks if the transfer is complete, as indicated by the DMA count stored in Accumulator 218 being decremented down to zero.

Instruction e: "LOAD ACC, R1" loads the contents of Register R1 212 into Accumulator 218. Instruction f: "SUB 1" decrements the value of Accumulator 218 by one and thereby decrements the DMA count. Instruction 10: "LOAD R1, ACC" loads the decremented DMA count from Accumulator 218 to Register R1 212. Instruction 11: "BZ 16" exits the routine if the DMA transfer is complete. Instruction 12: "LOAD ACC, R0" loads the current DMA transfer address from Register R0 210 into Accumulator 218. Instruction 13: "ADD 8" increments the current DMA transfer address. Instruction 14: "LOAD R0, ACC" stores the new DMA transfer address in Register R0 212. Instruction 15: "BNZ 1" starts the next DMA. Instruction 16: "INT" sends an interrupt to PCI Bus 230. Instruction 17: "HALT" freezes the program counter. Thus, this routine performs a chain of four DMA transfers from System Memory 106 to Print_FIFO 320.

MEMORY COPY

The following example illustrates a DMA memory copy routine. The routine uses a single DMA transfer to transfer a block of data from one section of System Memory 106 to another. The source start address, destination start address, and transfer size of the DMA operation are stored in Registers R0 210, R1 212, and R2 214 respectively. Data is moved in 32-byte blocks via PCI Buffer 224. Register R3 216 stores the buffer size in 32-bit words. The code for this routine is as follows:

| Initial Values | | |
| --- | --- | --- |
| PC | = | 00h |
| R0 | = | 00000000h |
| R1 | = | 00000400h |
| R2 | = | 00000020h |
| R3 | = | 00000008h |
| ACC | = | 00000000h |
| PC_WAIT | = | 1 |
| HOLD_PCn | = | 1 |
| B0_LO | = | 00000000h |
| B0_HI | = | 00000000h |
| B1_LO | = | 00000000h |
| B1_HI | = | 00000000h |
| B2_LO | = | 00000000h |
| B2_HO | = | 00000000h |
| B3_LO | = | 00000000h |
| B3_HI | = | 00000000h |
| MASK_LO | = | 0h |
| MASK_HI | = | 0h |

| Address | Instruction |
| --- | --- |
| 0: | NOP |
| 1: | LOAD ACC, R0 |
| 2: | LOAD dma_addr, ACC |
| 3: | ADD 8 |
| 4: | LOAD R0, ACC |
| 5: | LOAD ACC, R3 |
| 6: | LOAD dma_size, ACC |
| 7: | MOVE BUF, PCI |
| 8: | LOAD ACC, R1 |
| 9: | LOAD dma_addr, ACC |
| a: | ADD 8 |
| b: | LOAD R1, ACC |
| c: | LOAD ACC, R3 |
| d: | LOAD dma_size, ACC |
| e: | MOVE PCI, BUF |
| f: | LOAD ACC, R2 |
| 10: | SUB 1 |
| 11: | LOAD R2, ACC |
| 12: | BNZ 1 |
| 13: | INT |
| 14: | HALT |
| 15: | NOP |

Instruction 1: "LOAD ACC, R0" loads the start address for the data to be copied from Register R0 210 to Accumulator 218. Instruction 2: "LOAD dma_addr, ACC" loads the start address for the data transfer from Accumulator 218 to Add_Count 360. Instruction 3: "ADD 8" increments the source address. Instruction 4: "LOAD R0, ACC" stores the new data source address in Register R0 210. Instruction 5: "LOAD ACC, R3" loads the size of PCI Buffer 224 in 32-bit words from Register R3 216 into Accumulator 218. Instruction 6: "LOAD dma_size, ACC" loads the PCI Bus 230 to PCI Buffer 224 transfer size from Accumulator 218 into Xfr_Count 358. Instruction 7: "MOVE BUF, PCI" moves the data from PCI Bus 230 to PCI Buffer 224. Instruction 8: "LOAD ACC, R1" loads the data transfer destination address from Register R1 212 to Accumulator 218. Instruction 9: "LOAD dma_addr, ACC" loads the PCI Buffer 224 to PCI Bus 230 transfer address from Accumulator 218 to Add_Count 360. Instruction a: "ADD 8" increments the data transfer destination address. Instruction b: "LOAD R1, ACC" stores the new data transfer destination address in Register R1 212.

Instruction c: "LOAD ACC, R3" loads the PCI Buffer 224 size from Register R3 216 to Accumulator 218. Instruction d: "LOAD dma_size, ACC" loads the PCI Buffer 224 to PCI Bus 230 transfer size from Accumulator 218 to Xfr_Count 358. Instruction e: "MOVE PCI, BUF" transfers the data from PCI Buffer 224 to PCI Bus 230. Instruction f: "LOAD ACC, R2" loads the number of 32-byte bursts required to satisfy the total DMA size from Register R2 214 to Accumulator 218. Instruction 10: "SUB 1" decrements the burst count. Instruction 11: "LOAD R2, ACC" stores the decremented burst count in Register R2 214. Instruction 12: "BNZ 1" compares Accumulator 218 to zero to determine whether the DMA transfer is complete, if it is not complete the program branches to instruction 1.

Instruction 13: "INT" sends an interrupt to PCI Bus 230 to indicate the DMA transfer is complete. Instruction 14: "HALT" freezes Program Counter 226. Thus, the program performs a single DMA transfer to copy a block of data from one section of system memory to another.

MEMORY FILL

A further example of a type of operation that the programmable DMA controller of the present invention can perform is a memory fill. A memory fill operation fills an area of memory with a pattern. For example, DMA controller 200 can use a memory fill operation to fill a printer frame buffer with a fixed pattern, which can save more than a second of microprocessor time by avoiding having the microprocessor clear the page. The following routine uses four DMA transfers to fill four separate blocks of System Memory 106 with the 64-bit constant stored in registers R1 212, and R0 210. The start address and transfer size for the DMA is stored in System Memory 106. Register R2 214 stores the start address for the DMA transfer parameters.

| Initial Values | | |
| --- | --- | --- |
| PC | = | 00h |
| R0 | = | a5a5a5a5h |
| R1 | = | 5a5a5a5ah |
| R2 | = | 00000810h |
| R3 | = | 00000004h |
| ACC | = | 00000000h |
| PC_WAIT | = | 1 |
| HOLD_PCn | = | 1 |
| B0_LO | = | 00000000h |
| B0_HI | = | 00000000h |
| B1_LO | = | 00000000h |
| B1_HI | = | 00000000h |
| B2_LO | = | 00000000h |
| B2_HI | = | 00000000h |
| B3_LO | = | 00000000h |
| B3_HI | = | 00000000h |
| MASK_LO | = | 0h |
| MASK_HI | = | 0h |

| Address | Instruction |
| --- | --- |
| 0: | NOP |
| 1: | LOAD ACC, R2 |
| 2: | LOAD dma_addr, ACC |
| 3: | LOAD ACC, R3 |
| 4: | SUB R3 |
| 5: | ADD 8 |
| 6: | LOAD dma_size, ACC |
| 7: | MOVE BUF, PCI |

-continued

| | |
|---|---|
| 8: | LOAD ACC, B0_L0 |
| 9: | LOAD dma_addr, ACC |
| a: | LOAD ACC, B0_HI |
| b: | LOAD dma_size, ACC |
| c: | MOVE PCI, REG |
| d: | LOAD ACC, R3 |
| e: | SUB 1 |
| f: | LOAD R3, ACC |
| 10: | BZ 15 |
| 11: | LOAD ACC, R2 |
| 12: | ADD 8 |
| 13: | LOAD R2, ACC |
| 14: | BNZ 2 |
| 15: | INT |
| 16: | HALT |
| 17: | NOP |

Instruction 1: "LOAD ACC, R2" loads the DMA transfer parameters address from Register R2 214 into Accumulator 218. Instruction 2: "LOAD dma_addr, ACC" loads the DMA transfer parameters address from Accumulator 218 into Add_Count 360. Instruction 3: "LOAD ACC, R3" loads the number of DMA transfers to be made from Register R3 216 into Accumulator 218. Instruction 4: "SUB R3" subtracts the contents of Register R3 216 from Accumulator 218. This clears Accumulator 218.

Instruction 5: "ADD 8" places the size of the buffer into Accumulator 218. Instruction 6: "LOAD dma_size, ACC" loads the size of the PCI Bus 230 to PCI Buffer 224 transfer from Accumulator 218 to Xfr_Count 358. Instruction 7: "MOV BUF, PCI" moves the DMA transfer parameters from PCI Bus 230 to PCI Buffer 224. Instruction 8: "LOAD ACC, B0_LO" loads the register to PCI DMA address from B0_LO 330 to Accumulator 218. Instruction 9: LOAD dma_addr, ACC" loads the register to PCI DMA address from Accumulator 218 to Add_Count 360. Instruction a: "LOAD ACC, B0_HI" loads the register to PCI DMA size from B_HI 340 to Accumulator 218. Instruction b: "LOAD dma_size, ACC" loads the register to PCI DMA size from Accumulator 218 to Xfr_Count 358. Instruction c: "MOVE PCI, REG" moves the register constant that is being used to fill a block of System Memory 106 from Registers R0 210 and R1 212 to PCI Bus 230. Instruction d: "LOAD ACC, R3" loads the number of DMA transfers that have yet to be made from Register R3 216 to Accumulator 218. Instruction e: "SUB 1" decrements the DMA transfer count in Accumulator 218. Instruction f: "LOAD R3, ACC" loads the decremented DMA transfer count from Accumulator 218 to Register R3 216. Instruction 10: "BZ 15" branches to the end of the routine if the DMA transfer count in Accumulator 218 has been decremented to zero, thereby indicating that all the DMA transfers have been completed.

Instruction 11: "LOAD ACC, R2" loads the start address for the parameters of the DMA transfer just completed. Instruction 12: "ADD 8" increments the start address for the DMA transfer to correspond to the parameters for the next DMA transfer. Instruction 13: "LOAD R2, ACC" loads the new DMA transfer parameters start address from Accumulator 218 to Register R2 214 for storage. Instruction 14: "BNZ 2" compares the contents of Accumulator 218 to zero, and therefore returns to instruction 2 to start the next DMA. Instruction 15: "INT" sends an interrupt via PCI Bus 230 to indicate the DMA transfers are complete. Instruction 16: "HALT" freezes Program Counter 226. Thus, the routine performs four DMA transfers and fills four separate blocks of System Memory 106 with the 64-bit constant stored in Registers R0 210 and R1 212.

OTHER APPLICATIONS

A further application of the programmable DMA controller of the present invention is duplex printing. Duplex printing is where print data is transferred in reverse order to a print engine. In contrast to prior art systems where print data is reversed in the frame buffer using a software operation executed by a CPU, the programmable DMA controller of the present invention can perform duplex printing operations and thereby free up the CPU for other tasks. In the duplex printing operation the last address of an image stored in system memory is configured as the start address of the DMA transfer. During the DMA transfer, the address is decremented rather than incremented. Hence, when the DMA transfer is complete, the final system memory address accessed by the DMA controller will contain the very first data sample of the image.

Another application of the programmable DMA controller of the present invention is transferring data to a compressor. For example, Joint Photo Experts Group ("JPEG") type compressors compress 8×8 pixel blocks that are not contiguous in memory. The programmable DMA controller of the present invention can retrieve the 8×8 pixel blocks and transfer the image data to a JPEG compressor. This is more efficient than prior art systems that store eight lines of data in a temporary memory in order to retrieve the 8×8 pixel blocks.

SIMD

Another embodiment of the programmable DMA controller of the present invention uses a Single Instruction stream Multiple Data stream ("SIMD") processor. SIMD type processors are defined by the Flynn classification system as those with $m_1=1$, and $m_D>1$, where $m_1$ and $m_D$ denote the minimum number of instruction and data streams, respectively, that are being actively processed in any of the major steps in processing an instruction. The variables $m_1$ and $m_D$ indicate the degree of parallelism in a processor. SIMD type processors include systems which have a single program control unit and multiple execution units.

The SIMD programmable DMA controller instructions are composed of several micro instructions which move several words in one instruction. The SIMD programmable DMA controller embodiment has an enhancement to the Opcode Decoder 316, FIG. 3, which translates the additional SIMD instructions into signals to control the flow of multiple data streams.

Thus a method and apparatus for a programmable DMA controller have been described. Although the present invention has been described with respect to certain specific embodiments, it will be clear to those skilled in the art that the inventive features of the present invention are applicable to other embodiments as well, all of which are intended to fall within the scope of the present invention.

We claim:

1. An apparatus for transferring data on a bus, comprising:
   an input output bus interface adapted to connect to a computer;
   a dedicated input output first in first out interface adapted to connect to an external device;
   a program memory connected to said input output bus interface for storing a plurality of program instructions;
   said program memory capable of receiving a plurality of new program instructions under direction of said computer; and
   a processor for processing said new program instructions stored in said program memory to control said data received at said input output bus interface and said data transferred at said dedicated input output first in first out interface, so that said processor can transfer said data through said input output bus interface independent of control over said data by said computer.

2. The apparatus of claim 1 wherein said apparatus for transferring data is a direct memory access controller.

3. The apparatus of claim 1 wherein said program memory can receive said program instructions and said input output bus interface can receive said data from said bus.

4. The apparatus of claim 3 wherein said processor executes direct memory access commands.

5. The apparatus of claim 3 wherein said processor is a single instruction stream multiple data stream.

6. The apparatus of claim 4 wherein said external device is a print engine, and wherein said dedicated input output first in first out interface is used to drive said print engine.

7. The apparatus of claim 4 wherein said external device is an input peripheral and wherein said dedicated input output first in first out interface is used to receive data from said input peripheral.

8. The apparatus of claim 7 wherein said processor further comprises:
    addition means for adding data values;
    subtraction means for subtracting data values;
    byte shift means for shifting data bytes; and
    storage means for storing data values.

9. A method for transferring data between a computer and an external device across an input output bus comprising the steps of:
    downloading program instructions from said computer; and
    executing said stored program instructions to controllably transfer said data between said computer and said external device across said input output bus, independent of control over said data by said computer.

10. The method of claim 9 wherein said step of executing said stored program instructions further comprises executing Single Instruction Multiple Data processor type instructions.

11. The method of claim 9 wherein said step of downloading program instructions further comprises downloading program instructions from a central processing unit.

12. The method of claim 11 wherein said step of executing said stored program instructions further comprises executing said stored program instructions to perform a direct memory access transfer.

13. The method of claim 12 wherein said step of executing said program instructions further comprises executing instructions to perform loading, addition, and branching operations.

14. The method of claim 13 wherein said step of executing said program instructions further comprises performing duplex printing operations.

15. The method of claim 13 wherein said step of executing said program instructions further comprises transferring non-contiguous blocks of data in memory to an image compression changing device.

16. The apparatus of claim 1, wherein said computer comprises:
    a chip set;
    a central processing unit connected to said chip set; and
    a system memory connected to said chip set.

17. The apparatus of claim 7, wherein said processor further comprises:
    means for operating on said data.

18. The apparatus of claim 7 wherein said processor further comprises:
    addition means for adding data values.

19. The apparatus of claim 7 wherein said processor further comprises:
    subtraction means for subtracting data values.

20. The apparatus of claim 7 wherein said processor further comprises:
    byte shift means for shifting data bytes.

21. The apparatus of claim 7 wherein said processor further comprises:
    storage means for storing data values.

22. The apparatus of claim 17, wherein said means for operating on said data further comprises:
    a single register file.

23. An apparatus for transferring data on a bus between a computer and an external device in response to programmable instructions, comprising:
    an input output bus interface adapted to connect to said computer for transferring said data between said computer and said input output bus interface;
    an input output first in first out interface adapted to connect to said external device for transferring said data between said input output first in first out interface and said external device;
    a program memory connected to said input output bus interface for storing a plurality of program instructions;
    said program memory capable of receiving and storing a plurality of new program instructions from said computer; and
    a processor for processing said new program instructions stored in said program memory and for operating on said data, to controllably transfer said data through said input output bus interface and to controllably transfer said data through said input output first in first out interface, independent of control over said data by said computer.

* * * * *